US011087146B2

(12) United States Patent
Watanabe (10) Patent No.: US 11,087,146 B2
(45) Date of Patent: Aug. 10, 2021

(54) LANE-LINE RECOGNIZING APPARATUS

(71) Applicant: SUBARU CORPORATION, Tokyo (JP)

(72) Inventor: Akihiro Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 144 days.

(21) Appl. No.: 16/514,552

(22) Filed: Jul. 17, 2019

(65) Prior Publication Data

US 2020/0104608 A1    Apr. 2, 2020

(30) Foreign Application Priority Data

Sep. 28, 2018   (JP) .............................. JP2018-185559

(51) Int. Cl.
*G06K 9/00* (2006.01)
*G06K 9/03* (2006.01)
*G06K 9/46* (2006.01)
*G08G 1/16* (2006.01)

(52) U.S. Cl.
CPC ......... *G06K 9/00798* (2013.01); *G06K 9/036* (2013.01); *G06K 9/46* (2013.01); *G08G 1/167* (2013.01)

(58) Field of Classification Search
CPC ...... G06K 9/00798; G06K 9/46; G06K 9/036; G06K 9/6201; G06T 2207/30256; G06T 2207/20061; G06T 7/12; G08G 1/167
See application file for complete search history.

(56) References Cited

U.S. PATENT DOCUMENTS

| 2002/0042668 A1* | 4/2002 | Shirato | G06K 9/00798 701/1 |
| 2002/0131620 A1* | 9/2002 | Shirato | G06K 9/00798 382/104 |
| 2006/0210116 A1* | 9/2006 | Azuma | G06K 9/00798 382/104 |
| 2012/0215377 A1 | 8/2012 | Takemura et al. | |
| 2017/0193338 A1* | 7/2017 | Huberman | G06K 9/00791 |

(Continued)

FOREIGN PATENT DOCUMENTS

| CN | 107590470 A | * 1/2018 |
| JP | 2011-073529 A | 4/2011 |

*Primary Examiner* — Jingge Wu
(74) *Attorney, Agent, or Firm* — McDermott Will & Emery LLP (57) ABSTRACT

A lane-line recognizing apparatus includes an acquiring unit, an extractor, and an identifier including a storage and an estimator. The acquiring unit acquires a traveling environment information on a traveling environment in front of an own vehicle. The extractor extracts feature quantities of lane-line components of lane lines from each frame image on a basis of the traveling environment information acquired by the acquiring unit. The identifier identifies the lane lines on the basis of the feature quantities extracted by the extractor. The storage stores the feature quantities extracted by the extractor. When the feature quantities are extracted again after a transition from a condition where the lane lines are identifiable to a condition where the lane lines are unidentifiable, the estimator estimates, on the basis of the feature quantities stored in the storage, the lane lines after the transition to the condition where the lane lines are unidentifiable.

2 Claims, 10 Drawing Sheets

(56) References Cited

U.S. PATENT DOCUMENTS

| | | | |
|---|---|---|---|
| 2018/0129887 A1* | 5/2018 | Kang | G06K 9/00798 |
| 2018/0164812 A1* | 6/2018 | Oh | G06N 7/005 |
| 2018/0178839 A1* | 6/2018 | Ide | B62D 15/029 |
| 2018/0181817 A1* | 6/2018 | Yan | G06K 9/6273 |
| 2018/0260634 A1* | 9/2018 | Kim | G06K 9/6211 |
| 2018/0293466 A1* | 10/2018 | Viswanathan | G05D 1/0246 |
| 2018/0293684 A1* | 10/2018 | Ye | G06K 9/3258 |
| 2018/0307930 A1* | 10/2018 | Mittal | G06K 9/00798 |
| 2019/0251372 A1* | 8/2019 | Dwivedi | G06K 9/00798 |
| 2019/0279004 A1* | 9/2019 | Kwon | G06T 7/70 |

\* cited by examiner

LANE-LINE RECOGNIZING APPARATUS

CROSS-REFERENCE TO RELATED APPLICATIONS

The present application claims priority from Japanese Patent Application No. 2018-185559 filed on Sep. 28, 2018, the entire contents of which are hereby incorporated by reference.

BACKGROUND

The technology relates to a lane-line recognizing apparatus that identifies a lane line defining a traveling lane.

A typical drive assist system has been known which performs lane keep control or lane departure prevention control. In the lane keep control, a traveling environment is detected in front of an own vehicle traveling on an ordinary road or an expressway. On the basis of the information on the traveling environment detected, lane lines (e.g., white lines) are recognized that define a traveling lane on which the own vehicle is traveling. A target traveling course is set in a middle between the right and left lane lines, and the own vehicle is caused to travel along the target traveling course. In the lane departure prevention control, an alarm is generated when the own vehicle deviates from the recognized lane lines to call the driver's attention.

To achieve the control that causes the own vehicle to travel accurately along the traveling lane, it is necessary to constantly recognize the right and left lane lines that serve as reference lines. One example technique for recognizing the right and left lane lines is disclosed in Japanese Unexamined Patent Application Publication (JP-A) No. 2011-73529, for example. In this technique, feature quantities of lane lines are detected on the basis of information on a traveling environment in front of an own vehicle obtained by, for example, an in-vehicle camera. Thereafter, the reliability of the lane lines recognized on the basis of the feature quantities is calculated and evaluated. Only when the lane lines are evaluated to have high reliability, the drive assist control is executed, thereby preventing malfunctions.

In such a typical technique disclosed in JP-A No. 2011-73529, for example, the reliability is lowered when the lane lines are partly broken by being partly covered with snow, by being partly faded, or by the presence of an intersection, for example. Such lowering of the reliability causes the drive assist control to be cancelled. To restart the drive assist control after the lane lines are recovered or after the own vehicle passes through an intersection, the reliability of lane lines needs to be evaluated again.

SUMMARY

An aspect of the technology provides a lane-line recognizing apparatus. The lane-line recognizing apparatus includes an acquiring unit, an extractor, and an identifier including a storage and an estimator. The acquiring unit is configured to acquire a traveling environment information on a traveling environment in front of an own vehicle. The extractor is configured to extract feature quantities of lane-line components of lane lines from each of frame images on a basis of the traveling environment information acquired by the acquiring unit. The lane lines respectively define a right side and a left side of a traveling lane on which the own vehicle is traveling. The frame images are directed to a predetermined search region extending from a region in front of the own vehicle to a region far from the own vehicle. The identifier is configured to identify the lane lines on the basis of the feature quantities extracted by the extractor. The storage is configured to store the feature quantities extracted by the extractor. When the feature quantities are extracted again after a transition from a condition where the lane lines are identifiable to a condition where the lane lines are unidentifiable, the estimator is configured to estimate, on the basis of the feature quantities stored in the storage, the lane lines after the transition to the condition where the lane lines are unidentifiable.

An aspect of the technology provides a lane-line recognizing apparatus. The lane-line recognizing apparatus includes circuitry configured to: acquire a traveling environment information on a traveling environment in front of an own vehicle; extract feature quantities of lane-line components of lane lines from each of frame images on a basis of the traveling environment information acquired, the lane lines respectively defining a right side and a left side of a traveling lane on which the own vehicle is traveling, the frame images being directed to a predetermined search region extending from a region in front of the own vehicle to a region far from the own vehicle; identify the lane lines on the basis of the feature quantities extracted; store the feature quantities extracted; and when the feature quantities are extracted again after a transition from a condition where the lane lines are identifiable to a condition where the lane lines are unidentifiable, estimate, on the basis of the feature quantities stored, the lane lines after the transition to the condition where the lane lines are unidentifiable.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the following, some embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

To restart drive assist control after cancellation of the drive assist control due to partly broken lane lines that defines right and left sides of a lane on which an own vehicle is traveling, an additional time is needed to evaluate the reliability of the lane lines.

This can result in a delay in recognizing the lane lines, and in turn, a delay in restarting the drive assist control. If the drive assist control was not restarted despite the recognition of the lane lines by the driver, there could be any mismatching with the driver's recognition, which might make the driver to feel uncomfortable.

Accordingly, it is desirable to provide a lane-line recognizing apparatus that makes it possible to restart drive assist control earlier even after temporary cancellation of the drive assist control due to broken lane lines that define a traveling lane on which an own vehicle is traveling, and thus prevent the driver from experiencing a feeling of strangeness.

Figure 1:
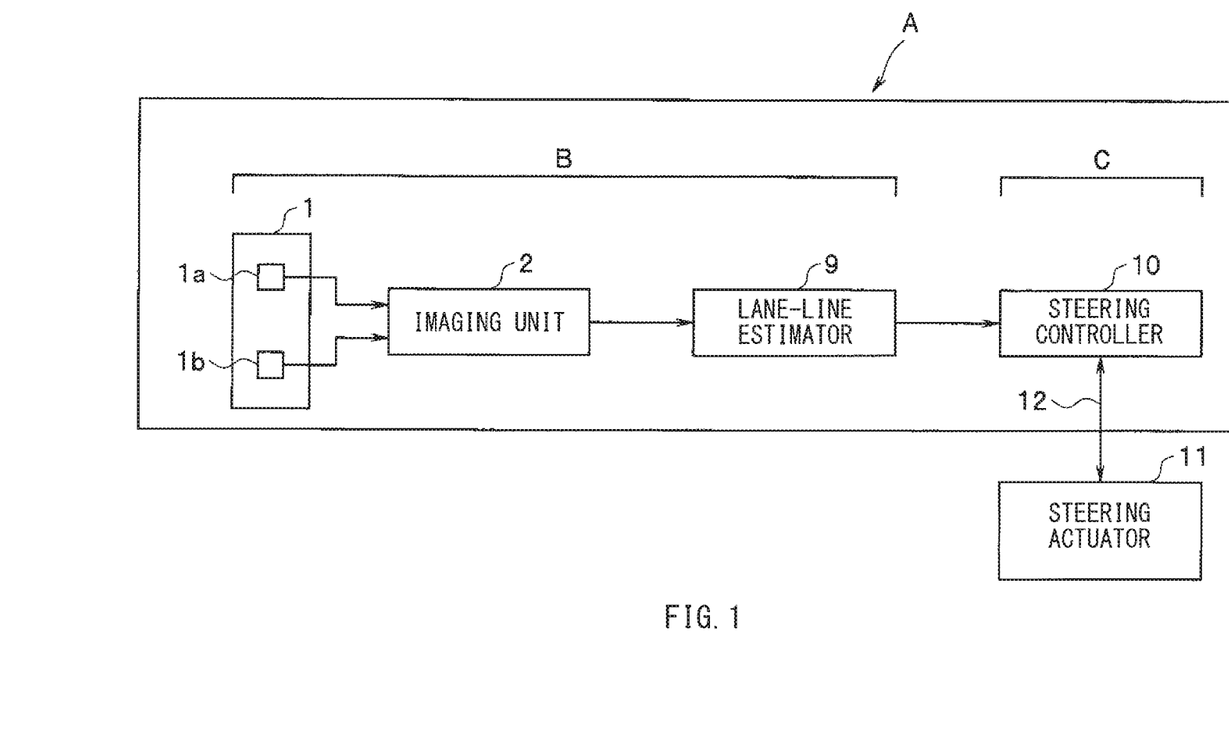
FIG. 1 is a block diagram illustrating an example configuration of a drive assist system according to one embodiment of the technology.

FIG. 1 illustrates a drive assist system A according to one example embodiment of the technology. The drive assist system A may include an image processing system B and a steering control system C. The image processing system B includes an imaging unit 1, an image processor 2, and a lane-line estimator 9. In one embodiment, the imaging unit 1 and the image processor 2 may serve as an "acquiring unit" that acquires a traveling environment information. In one embodiment, the lane-line estimator 9 may serve as an "identifier". The steering control system C may include a steering controller 10 and a steering actuator 11. The steering actuator 11 may include an electric motor or a hydraulic pressure motor, for example.

The steering controller 10 may include a microcomputer, for example. The steering controller 10 may be coupled to the steering actuator 11 via an in-vehicle communication line 12, such as a a controller area network (CAN), to establish bidirectional communication between the steering controller 10 and the steering actuator 11. The steering controller 10 may execute drive assist control including lane keep control or lane departure prevention control that causes an own vehicle M (refer to FIGS. 9 to 11) to travel along a traveling lane.

In the example embodiment, the steering controller 10 may determine an angle of a steering wheel (hereinafter referred to as a "steering wheel angle") on the basis of a signal received from the image processing system B. The steering wheel angle may be defined so as to cause the own vehicle M to travel on a middle of a traveling lane defined between a right lane line Lr and and a left lane line Ll (refer to FIGS. 9 to 11). When the own vehicle M is predicted to deviate from the right lane line Lr and and left lane line Ll, the steering wheel angle may be defined in a direction opposite to the deviation to prevent the deviation. The steering controller 10 may transmit, to the steering actuator 11, the steering torque corresponding to the defined steering wheel angle.

The steering actuator 11 may actuate a steering operation on the basis of the steering torque received from the steering controller 10 to adjust a traveling direction of the own vehicle M.

Figure 2:
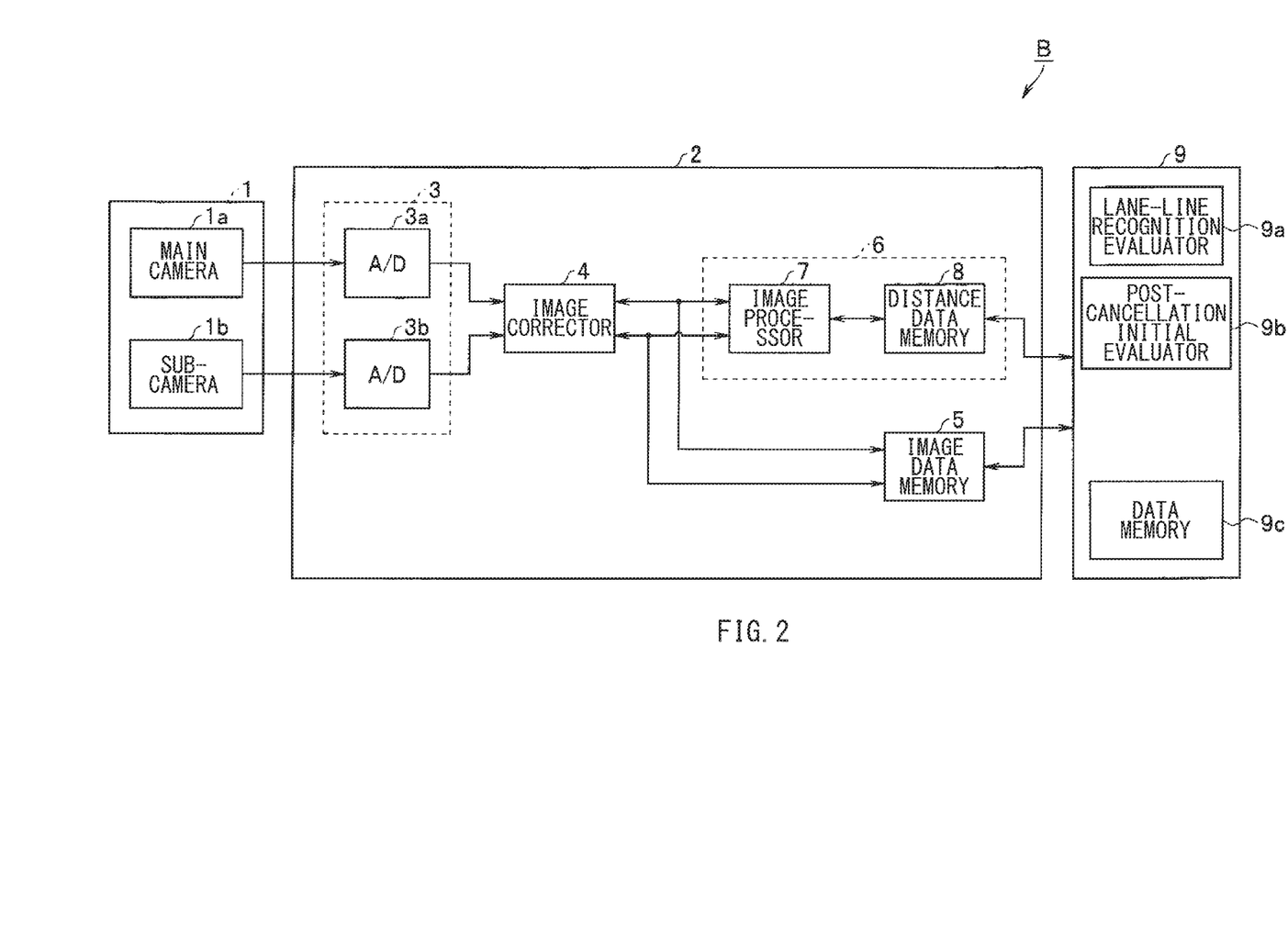
FIG. 2 is a block diagram illustrating an image processing system in the drive assist system illustrated in FIG. 1.

With reference to FIG. 2, the imaging unit 1 in the image processing system B may include a stereo camera having a main camera 1a and a sub-camera 1b. The main camera 1a and the sub-camera 1b may be disposed above a rearview mirror and adjacent to a front windshield, for example. The main camera 1a and the sub-camera 1b may be laterally apart at regular intervals from an axis extending in the middle of the width of the own vehicle M so as to define a predetermined baseline length therebetween. The main camera 1a and the sub-camera 1b may each include an imaging device such as a charge coupled device (CCD) or a complementary metal-oxide-semiconductor (CMOS). These imaging devices may capture an image of a traveling environment in front of the own vehicle M. The captured image may include a traveling lane on which the own vehicle M is traveling.

Analog images respectively captured by the main camera 1a and the sub-camera 1b may be transmitted in pair to the image processor 2. The image processor 2 may include an A/D converter 3, an image corrector 4, an image data memory 5, and a distance data processor 6. The paired analog images captured by the main camera 1a and the sub-camera 1b may be converted at respective A/D converters 3a and 3b in the A/D converter 3 into digital images each having a predetermined luminance. The digital images may be transmitted to the image corrector 4.

The image corrector 4 may correct the digital images. For example, the image corrector 4 may remove a shift or a noise due to an error in position between the main camera 1a and the sub-camera 1b to correct the luminance of the digital images. Reference image data may be created on the basis of the output signal from the main camera 1a, and comparative image data may be created on the basis of the output signal from the sub-camera 1b. The reference image data and the comparative image data may be stored in the image data memory 5 and may also be transmitted to the distance data processor 6.

The distance data processor 6 may include an image processor 7 and a distance data memory 8. The image processor 7 may recognize the same object appearing in the reference image data and the comparative image data on the basis of a parallax between the reference image data and the comparative image data. The image processor 7 may also calculate a distance (hereinafter referred to as "distance data") from the own vehicle M to the object recognized using triangulation. The distance data may be stored in the distance data memory 8. In this manner, the image data memory 5 and the distance data processor 6 may acquire traveling environment information on the traveling environment in front of the own vehicle M. The traveling environment information may include data on lane lines.

The lane-line estimator 9 may include a lane-line recognition evaluator 9a, a post-cancellation initial evaluator 9b, and a data memory 9c that stores feature quantities. In one embodiment, the post-cancellation initial evaluator 9b may serve as an "estimator". In one embodiment, the data memory 9c may serve as a "storage".

The lane-line recognition evaluator 9a may extract, from the image stored in the image data memory 5, groups of points corresponding to potential lane lines (hereinafter referred to as "potential lane-line points") that define a right side and a left side of the lane on which the own vehicle M is traveling. A lane line may be recognized by connecting the potential lane-line points into a straight line or a curve line. Alternatively, the lane line may be recognized through pattern matching with a lane-line model that is preliminarily stored. Note that the type (e.g., a solid line or a dashed line) and the color (e.g., white or yellow) of the lane line may not be distinguished.

In one example embodiment, the lane-line recognition evaluator 9a may extract a group of potential lane-line points by evaluating a change in luminance along the width of the road on the image plane. The lane-line recognition evaluator 9a may recognize a lane line by processing the time-series data on the group of potential lane-line points.

Figure 7:
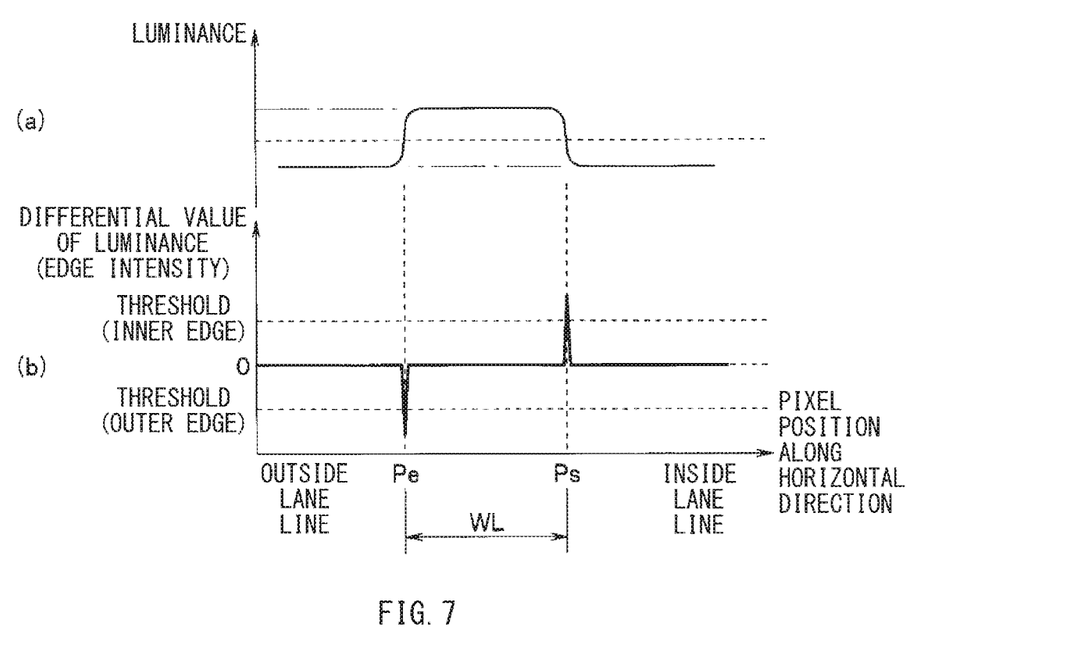
FIG. 7 is a characteristic diagram illustrating luminance characteristics of a horizontal line crossing lane lines, in which (a) of FIG. 7 illustrates a change in luminance, and (b) of FIG. 7 illustrates an edge intensity.

With reference to FIG. 7, for example, the lane-line recognition evaluator 9a may search multiple horizontal search lines extending along the width of the own vehicle M for an edge at which a change in luminance is greater than a predetermined level. The lane-line recognition evaluator 9a may thereby detect a pair of a lane-line start point Ps and a lane-line end point Pe per search line in a lane-line detection region set in the image. In other words, the lane-line recognition evaluator 9a may detect the lane-line start point Ps and the lane-line end point Pe on the basis of an edge intensity. The lane-line recognition evaluator 9a may extract, as a potential lane-line region, a predetermined region defined between the lane-line start point Ps and the lane-line end point Pe. Note that the reference characters "WL" in FIG. 7 represent the width of the lane line.

Thereafter, the lane-line recognition evaluator 9a may process time-series data on spatial coordinates of the potential lane-line points to create approximation models of the right and left lane lines. The time-series data on the spatial coordinates of the potential lane-line points may be based on a shift of the own vehicle M per unit time. The lane-line recognition evaluator 9a may recognize lane lines on the basis of the approximation models. Examples of the approximation models of the lane lines may include an approximation model created by connecting straight line components obtained by the Hough transform and an approximation model created using a linear or quadratic approximation.

Additionally, the lane-line recognition evaluator 9a may evaluate the reliability of the line components derived from the potential lane-line points. In other words, the lane-line recognition evaluator 9a may evaluate whether the line components certainly correspond to the lane lines that define the right and left sides of the traveling lane on which the own vehicle M is traveling. On the basis of the result of the evaluation, the lane-line recognition evaluator 9a may determine whether the line components certainly correspond to the lane lines. This prevents the occurrence of malfunctions of the drive assist control due to misrecognition. For example, misrecognition in the drive assist control is prevented which might be caused when the lane line is broken, when the lane line is temporary missing due to lane changing in a horizontal direction, or when the lane line is covered with snow, for example.

The lane-line recognition evaluator 9a may evaluate the line components derived from the potential lane-line points in terms of the reliability or certainty of being a lane line on the basis of multiple feature quantities obtained from each frame image. Examples of the feature quantities used for the evaluation may include the length of the region between the lane-line start point and the lane-line end point (i.e., the number of pixels), the edge intensity, the luminance, the rate of the group of the lane-line end points to the group of the lane-line start points on the line component, and the height of the potential lane-line point from the road surface, in each frame images. The lane-line recognition evaluator 9a may evaluate the reliability of the line components on the basis of the multiple feature quantities extracted. The lane-line recognition evaluator 9a may evaluate that the extracted line components certainly correspond to lane lines when the feature quantities are each rated with a predetermined evaluation scale or higher.

Figure 3:
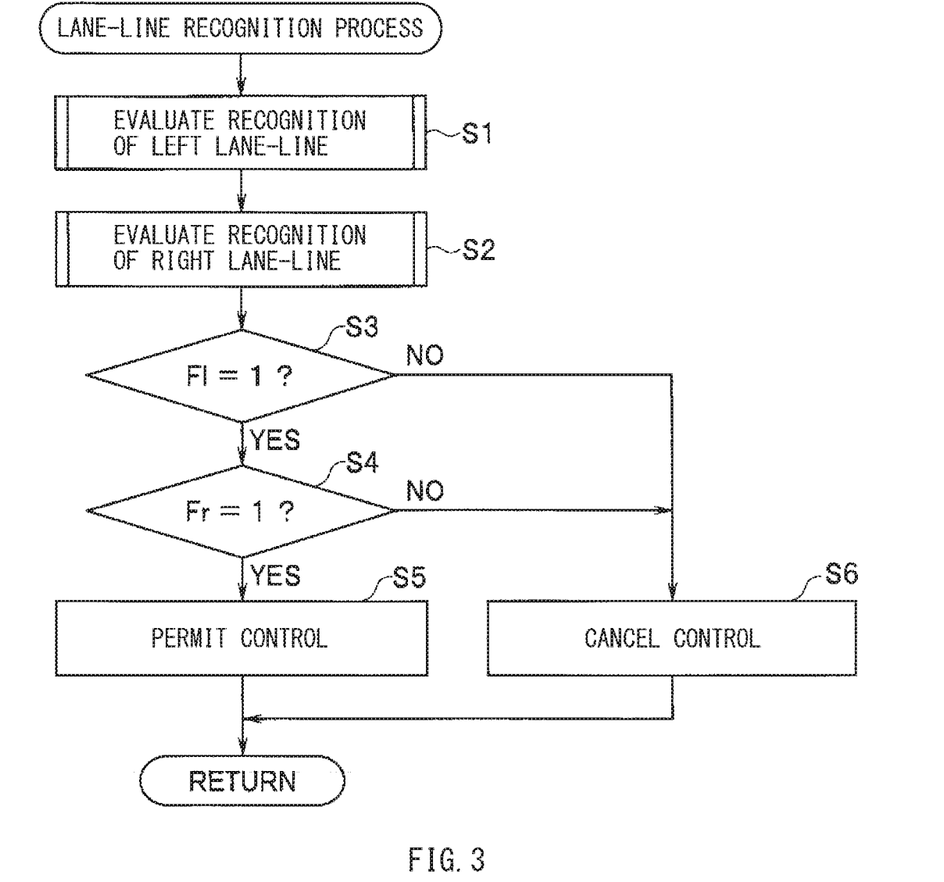
FIG. 3 is a flowchart illustrating an example routine for recognizing a lane line according to one embodiment of the technology.

The lane-line recognition evaluator 9a may recognize the lane lines following a lane-line recognition routine illustrated in FIG. 3, for example.

The routine may start with Step S1 in which the reliability of the recognition of the left lane line is evaluated. Thereafter, in Step S2, the reliability of the recognition of the right lane line may be evaluated. The recognition evaluation in Steps S1 and S2 may be executed following a lane-line recognition evaluation sub-routine illustrated in FIG. 4. Note that the sub-routine may be executed individually in each of Steps S1 and S2. The character "x" in FIG. 4 may thus be read as "l" in Step S1 and "r" in Step S2.

Figure 4:
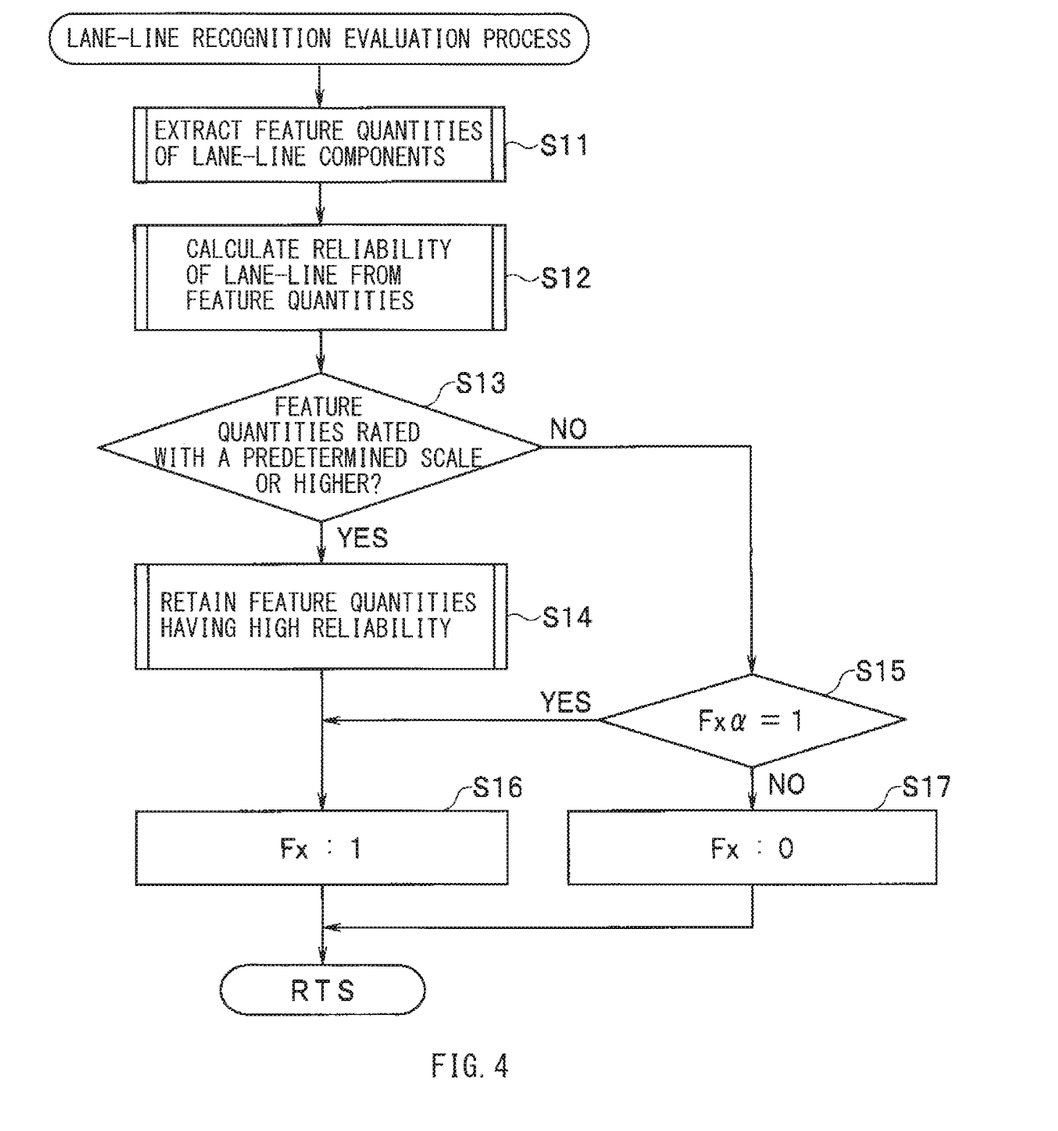
FIG. 4 is a flowchart illustrating an example subroutine for evaluating the recognition of the lane line according to one embodiment of the technology.

The sub-routine may start with Step S11 in which the feature quantity $\alpha x$ of the lane-line component may be extracted. The feature quantity $\alpha x$ may correspond to the feature quantity $\alpha l$ of a left lane-line component in Step S1, and the feature quantity $\alpha r$ of a right lane-line component in Step S2. In one embodiment, the lane-line recognition evaluator 9a that executes the process in Step S11 may serve as an "extractor".

As described above, the lane-line recognition evaluator 9a extracts, in a time-series order, the feature quantities $\alpha$ ln (n=1, 2, 3, 4, 5 . . . ) from each of a predetermined number of frame images (e.g., ten frame images). The predetermined number of frame images are directed to a predetermined region extending from a region in front of the own vehicle to a region far from the own vehicle M. The extracted feature quantities $\alpha$ ln (n=1, 2, 3, 4, 5 . . . ) may be used to evaluate the lane-line components.

Thereafter, in Step S12, the lane-line recognition evaluator 9a may evaluate the reliability or the certainty of being the lane line of the lane-line component on the basis of the extracted feature quantities. First, the feature quantities $\alpha$ ln (n=1, 2, 3, 4, 5 . . . ) may be evaluated in terms of reliability on a predetermined scale (e.g., on a scale of one to four). The reliability evaluated on the predetermined scale may be subjected to time-series evaluation. The time-series evaluation may be performed using a reliability evaluation counter.

Figure 8:
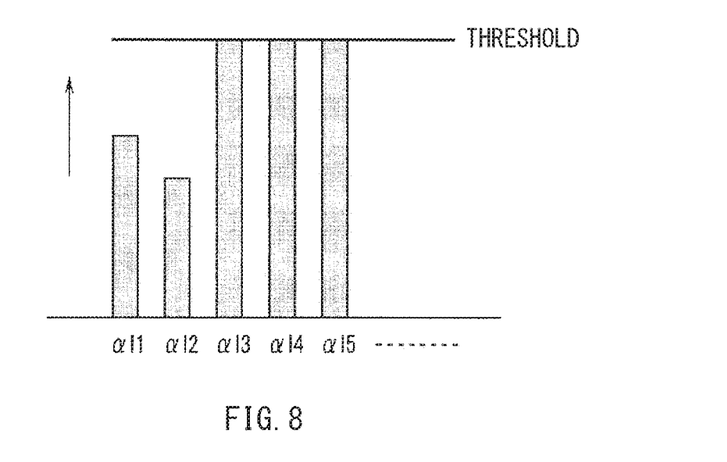
FIG. 8 is a diagram illustrating a reliability evaluation counter.

For example, with reference to FIG. 8, the feature quantities $\alpha l1$, $\alpha l2$, $\alpha l3$, $\alpha l4$, $\alpha l5$, . . . extracted from a predetermined number of frame images (e.g., ten frame images)

for the evaluation in terms of reliability may be counted using the reliability evaluation counter, until all the feature quantities reach a threshold.

When all the feature quantities reach the threshold, the procedure may proceed to Step S13. In Step S13, the lane-line recognition evaluator 9a may determine whether the feature quantities α ln (n=1, 2, 3, 4, 5 . . . ) are each rated with a predetermined evaluation scale or higher. In the case of evaluation on a four-point scale, for example, the lane-line recognition evaluator 9a may determine whether the feature quantities α ln are rated with 3 or higher. When the feature quantities α ln (n=1, 2, 3, 4, 5 . . . ) of a predetermined proportion or more are rated with a predetermined evaluation scale or higher, the lane-line recognition evaluator 9a may determine that the lane-line components certainly correspond to a lane line, and the procedure may proceed to Step S14. When the feature quantities α ln of less than the predetermined proportion are rated with a predetermined evaluation scale or higher, the lane-line recognition evaluator 9a may determine that the lane line is broken or that the lane line is not recognized, and the procedure may branch to Step S15. In an alternative example embodiment, the lane-line recognition evaluator 9a may determine, in Step S13, that the lane line is recognized only when all the feature quantities α ln are rated with a predetermined evaluation scale or higher, and the procedure may proceed to Step S14.

In Step S14, the feature quantities rated with a high evaluation scale or having high reliability may be stored in the data memory 9c, and the procedure may proceed to Step S16.

In Step S15, the value of a post-cancellation lane-line recognition flag Fxα (corresponding to Flα in Step S1 and Frα in Step S2) may be checked. When the value of the post-cancellation lane-line recognition flag Fxα is 1 (Fxα=1), that is, when both of the post-cancellation lane-line recognition flags Flα and Frα are set, the procedure may proceed to Step S16. When the post-cancellation lane-line recognition flag Fxα is 0 (Fxα=0), that is, when one or both of the post-cancellation lane-line recognition flags Flα Frα are cleared, the procedure may proceed to Step S17. Note that the post-cancellation lane-line recognition flag Fxα may be set following a post-cancellation lane-line recognition routine illustrated in FIG. 5, which is described below.

In Step S16, a control permission flag Fx (corresponding to Fl in Step S1 and Fr in Step S2) may be set (Fx: 1), and the procedure may exit the sub-routine.

In Step S17, the control permission flag Fx may be cleared (Fl: 0), and the procedure may exit the sub-routine.

Thereafter, the procedure may proceed to Step S3 in FIG. 3. In Step S3, the value of a control permission flag fl for the left lane line Ll may be checked. When the value of the control permission flag fl is 1 (Fl=1), the procedure may proceed to Step S4. When the value of the control permission flag fl is 0 (Fl=0), the procedure may jump to Step S6.

In Step S4, the value of a control permission flag fr for the right lane line Lr may be checked. When the value of the control permission flag Fr is 1 (Fr=1), the procedure may proceed to Step S5. When the value of the control permission flag Fr is 0 (Fr=0), the procedure may branch to Step S6.

When both of the right lane line Lr and the left lane line Ll are recognized, a control permission command may be outputted in Step S5, and the procedure may exit the routine. When one or both of the right and left lane lines are not recognized, a control cancel command may be outputted in Step S6, and the procedure may exit the routine.

Figure 6:
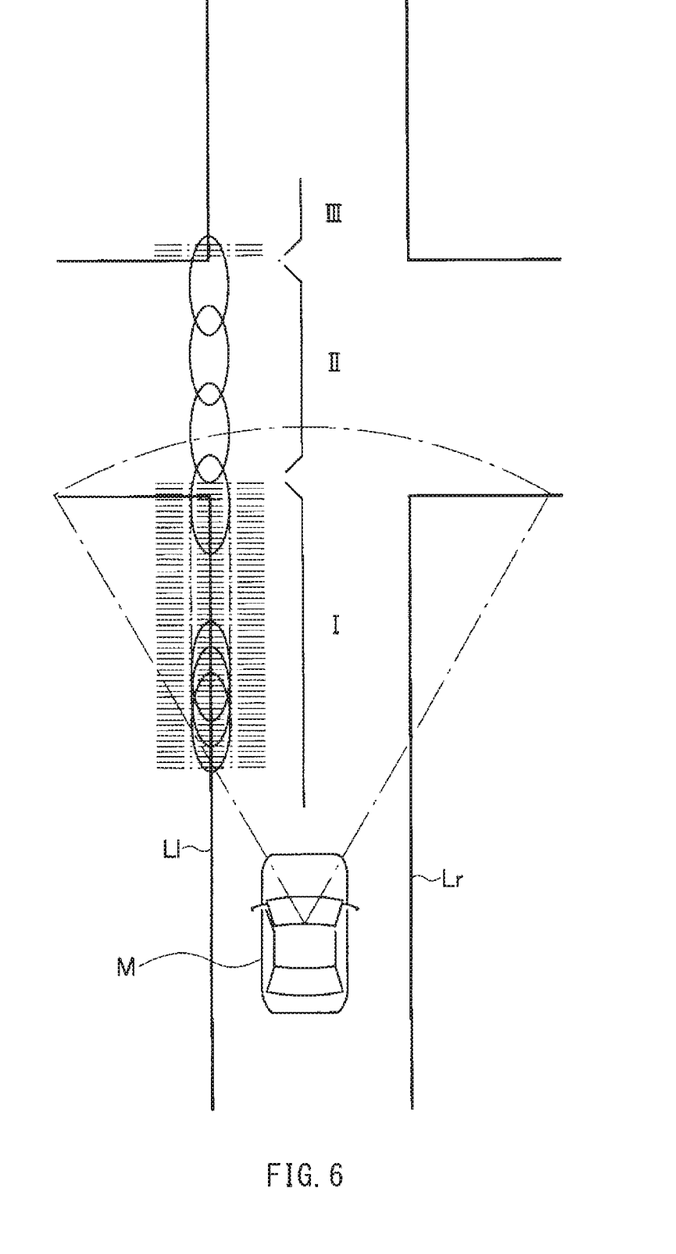
FIG. 6 is an explanatory diagram illustrating acquisition of images of zones by an imaging unit.

In an example situation illustrated in FIG. 6 where the lane line is clearly observed in a zone I, the feature quantities extracted, in a time-series order, from multiple (e.g., ten) frame images (indicated by horizontal lines in FIG. 6) may be rated with a high evaluation scale and thus have high reliability. As the own vehicle M travels forward, a zone II may be gradually included in a region detected by the main camera 1a and the sub-camera 1b of the imaging unit 1. Since the lane line detected in the zone II is broken, the evaluation scales of the feature quantities are gradually lowered, which lowers the reliability.

Figure 5:
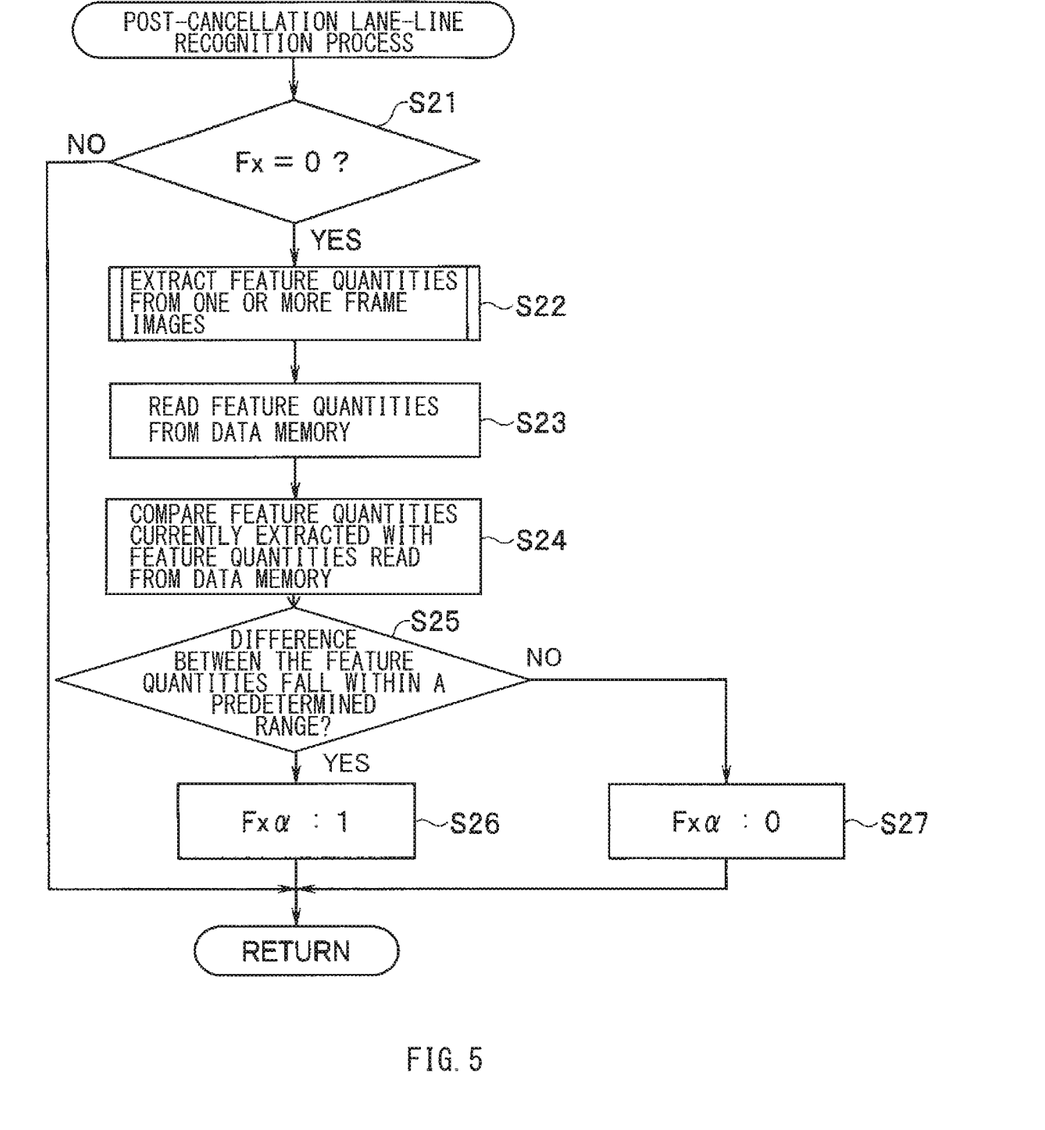
FIG. 5 is a flowchart illustrating an example routine for recognizing the lane line after cancellation of drive assist control according to one embodiment of the technology.

The value of the post-cancellation lane-line recognition flag Fxα (corresponding to Flα for the left lane line Ll and Frα for the right lane line Lr) may be set or cleared following the post-cancellation lane-line recognition routine illustrated in FIG. 5, for example.

The routine may be executed individually for the left lane-line component and the right lane-line component. The character "x" in FIG. 5 may thus be read as "l" in the routine for the left lane-line component, and "r" in the routine for the right lane-line component.

The routine may start with Step S21 in which the value of the control permission flag Fx may be checked. When the value of the control permission flag Fx is 0 (Fx=0), the procedure may proceed to Step S22. In Step S22, the feature quantities α ln (n=1, 2, 3, 4, 5 . . . ) may be extracted from one or more (e.g., two to four) frame images until all the feature quantities reach a predetermined threshold at which the drive assist control is allowed to restart.

When all the feature quantities α ln (n=1, 2, 3, 4, 5 . . . ) reach the predetermined threshold, the procedure may proceed to Step S23. In Step S23, the data on the feature quantities rated with a high evaluation scale may be read from the data memory 9c. Thereafter, in Step S24, the feature quantities read from the data memory 9c may be compared with the respective feature quantities currently extracted to calculate the difference therebetween.

Thereafter, in Step S25, a determination may be made of whether all the differences between the feature quantities fall within a predetermined range. When all the differences fall within the predetermined range, the lane-line components detected after the cancellation of the drive assist control may be determined to correspond to the lane line, and the procedure may proceed to Step S26. When the differences exceed the predetermined range, it may be determined that the lane-line components are not detected or the components seem likely to be lane-line components do not correspond to the lane line, and the procedure may proceed to Step S27.

In Step S26, the post-cancellation lane-line recognition flag Fxα may be set (Fxα: 1), and the procedure may exit the routine. When the procedure branches to Step S27, the post-cancellation lane-line recognition flag Fxα may be cleared (Fxα: 0), and the procedure may exit the routine.

The post-cancellation lane-line recognition flag Fxα may be read in Step S15 in FIG. 4. When the post-cancellation lane-line recognition flag Fxα is 1 (i.e., Fxa=1), the procedure may proceed to Step S16. In Step S16, the control permission flag Fx may be set (Fx: 1). When the post-cancellation lane-line recognition flag Fxα is 0 (Fxa=0), the procedure may proceed to Step S17, and the control permission flag Fx may be cleared (Fx: 0).

The value of the control permission flag Fx (corresponding to Fl for the left lane line and Fr for the right lane line) may be checked in Steps S3 and S4. When the predetermined conditions are satisfied, the drive-assist control may be permitted to be executed in Step S5.

In the example situation illustrated in FIG. 6 where the drive assist control is temporary cancelled due to the lane line partly broken and where lane-line components are detected in a zone III afterwards, the feature quantities having been extracted from the continuous lane line and rated with a high evaluation scale may be compared with the respective feature quantities currently extracted. When the differences therebetween fall within a predetermined range, the lane-line components having been extracted after the cancellation of the drive assist control may be determined to certainly correspond to the lane line.

Accordingly, even after the temporary cancellation of the drive assist control due to the broken lane lines Lr and Ll that define the traveling lane on which the own vehicle M is traveling, it is possible to recognize the lane lines earlier to restart the drive assist control. This makes it possible to reduce a feeling of strangeness of the driver.

Figure 9:
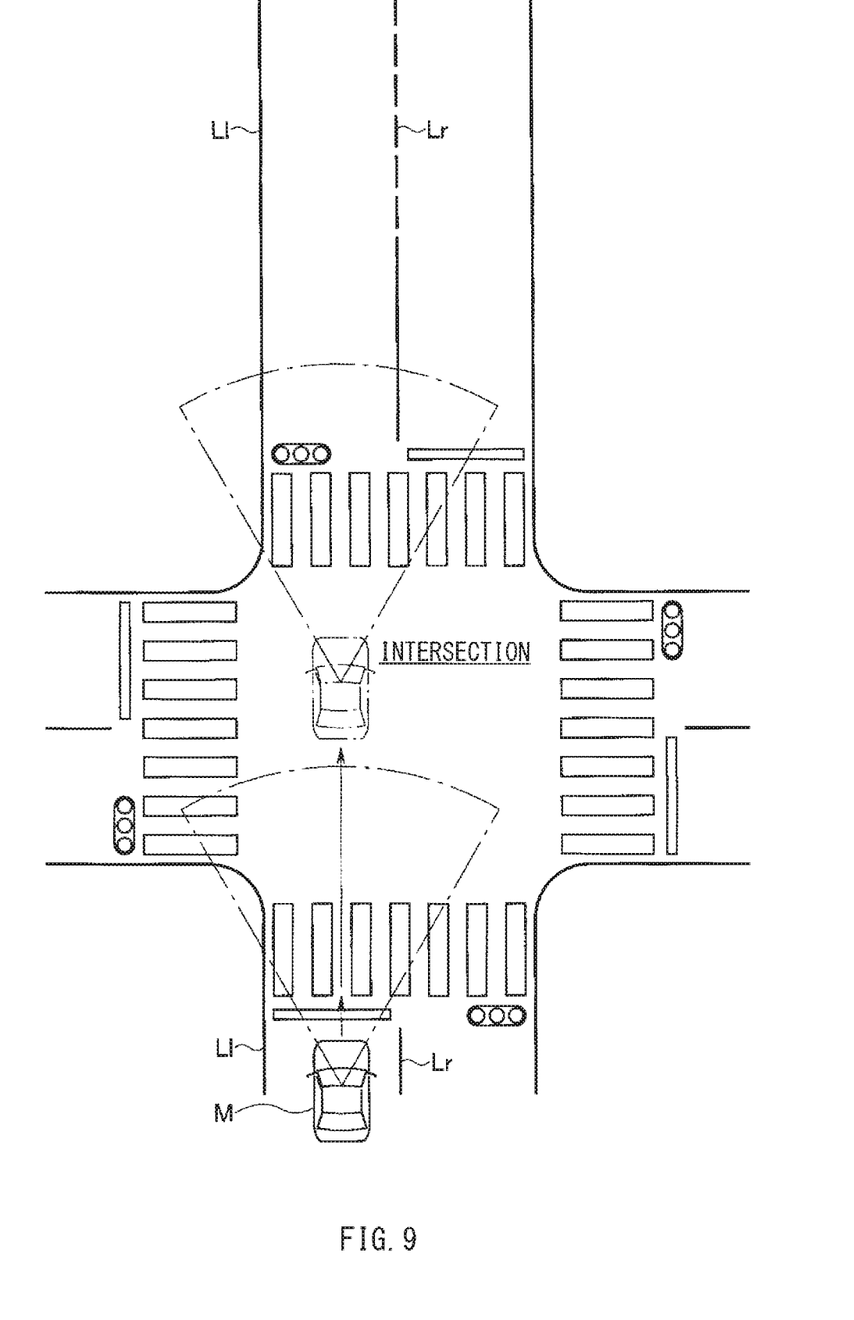
FIG. 9 is an explanatory diagram illustrating an example situation where the lane lines are partly broken while an own vehicle is passing through an intersection.

In an example situation illustrated in FIG. 9, the feature quantities read from the data memory 9c may be retained from entering of the own vehicle M into an intersection to exiting of the own vehicle M from the intersection. After the own vehicle passes through the intersection, several frame images of the right lane line Lr and left lane line Ll may be captured. The feature quantities may be extracted from the frame images captured. The feature quantities may be compared with the feature quantities read from the data memory 9c to determine differences therebetween. In a case where the differences fall within a predetermined range, the lane-line components detected after the cancellation of the drive assist control may be determined to correspond to the lane line. The result of the lane-line recognition is substantially the same as the result of the lane-line recognition by the driver.

Figure 10:
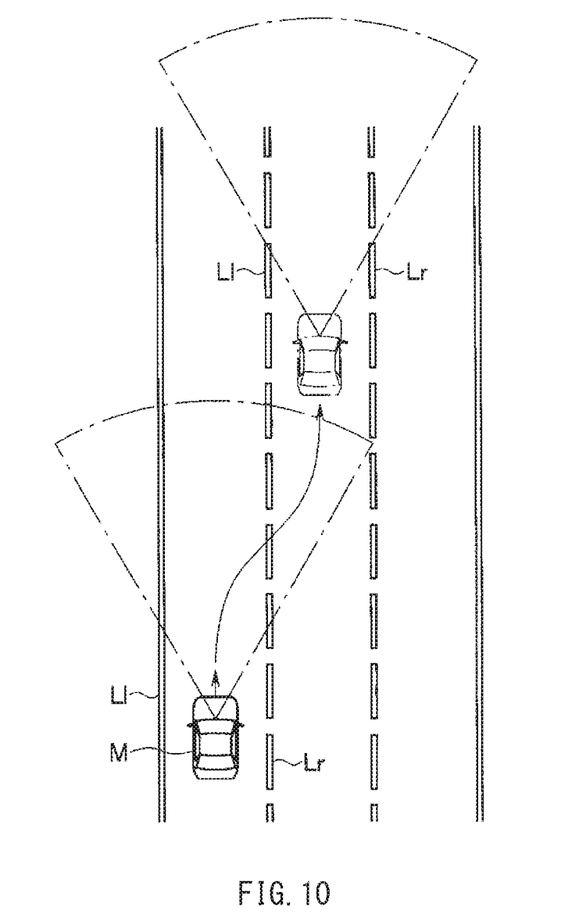
FIG. 10 is an explanatory diagram illustrating an example situation where the lane lines are partly broken while the own vehicle are changing lane lines.

In another example situation illustrated in FIG. 10, the own vehicle M inevitably travels across the right lane line Lr while changing lane lines from a left lane to an adjacent lane. While the own vehicle M is traveling across the right lane line Lr, the left lane line Ll moves leftward in the image captured by the imaging unit 1, and at the same time, the right lane line Lr moves from the right to the left in the image captured by the imaging unit 1. Afterwards, the right lane line Lr is located on the left side of the own vehicle M, and another lane line is located on the right side of the own vehicle. In this situation, the lane lines are recognized as being partly broken.

When the own vehicle M moves from the left lane to the middle lane, the right lane line Lr of the left lane becomes the left lane line Ll of the middle lane, and another right lane line Lr is additionally detected. These lane lines are supposed to have substantially the same features as each other because the left lane and the middle lane belong to the same traveling path. After the attitude of he own vehicle M is stabilized, the feature quantities of the right lane line Lr and left lane line Ll of the middle lane may be compared with the feature quantities of the right lane line Lr and and left lane line Ll of the left lane. This allows for early recognition of the lane lines.

Figure 11:
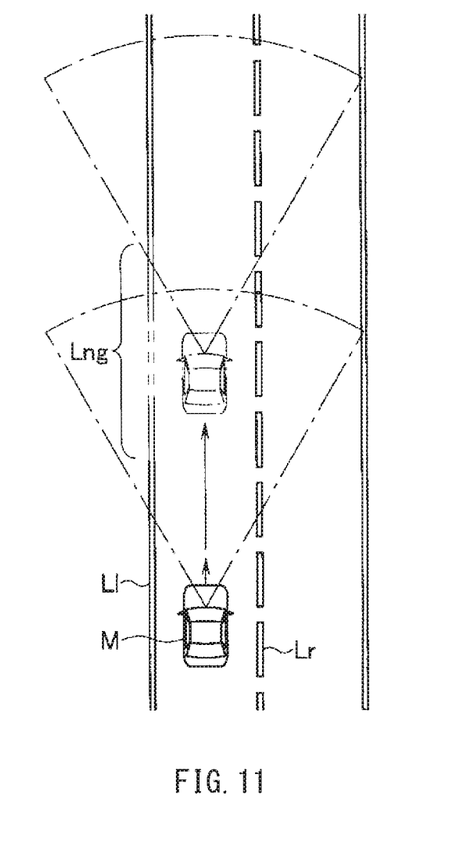
FIG. 11 is an explanatory diagram illustrating a lane line partly broken.

Even in another example situation where the own vehicle M keeps traveling on the same lane as illustrated in FIG. 11, the lane-line recognition is sometimes hindered in a lane-line missing region Lng in which the left lane line Ll is partly faded or partly covered with snow or other materials. To address such a concern, according to some of the example embodiments of the technology, the lane line Ll may be recognized immediately after recovery of the lane line Ll as in the case for the intersection illustrated in FIG. 9. The result of the lane-line recognition is substantially the same as the result of the lane-line recognition by the driver.

As described above, according to any example embodiment of the technology, the feature quantities of the lane-line components are extracted after the temporal cancellation of the drive assist control due to the broken lane lines Lr and Ll that define the lane on which the own vehicle M is traveling. The feature quantities extracted after the cancellation of the drive assist control may be compared with the respective feature quantities stored before the cancellation of the drive assist control and rated with a high evaluation scale to calculate the differences therebetween. When the differences fall within a predetermined range, the lane-line components are determined to correspond to the lane line. This allows for early recognition, as the lane lines Lr and Ll, of the lane-line components detected from the broken the lane line. Accordingly, it is possible to restart the drive assist control at substantially the same timing as the recognition of the lane lines by the driver, which reduces a feeling of strangeness of the driver.

Although some example embodiments of the technology are described hereinabove, the foregoing example embodiments are mere examples and are not intended to limit the scope of the technology. In another example embodiment, a width between the right lane line and the left lane line may be additionally detected as one of the feature quantities. It should be appreciated that modifications and alterations of the foregoing example embodiments may be made. It should be also appreciated that various omissions, replacements, and modifications may be made in the foregoing example embodiments described herein, without departing from the scope of the spirit of the technology. The technology is intended to include such modifications and alterations in so far as they fall within the scope of the appended claims or the equivalents thereof.

The image processor 2 and the lane-line estimator 9 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the image processor 2 and the lane-line estimator 9. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the image processor 2 and the lane-line estimator 9 illustrated in FIG. 2.

The invention claimed is:

1. A lane-line recognizing apparatus comprising:
an acquiring unit configured to acquire a traveling environment information on a traveling environment in front of an own vehicle;
an extractor configured to extract feature quantities of lane-line components of lane lines from each of frame images on a basis of the traveling environment information acquired by the acquiring unit, the lane lines respectively defining a right side and a left side of a traveling lane on which the own vehicle is traveling, the frame images being directed to a predetermined search region extending from a region in front of the own vehicle to a region far from the own vehicle; and an identifier configured to identify the lane lines on the basis of the feature quantities extracted by the extractor, the identifier comprising:

a storage configured to store the feature quantities extracted by the extractor; and an estimator configured to, when the feature quantities are extracted again after a transition from a condition where the lane lines are identifiable to a condition where the lane lines are unidentifiable, estimate, on a basis of the feature quantities stored in the storage, the lane lines after the transition to the condition where the lane lines are unidentifiable, wherein the storage is configured to store the feature quantities corresponding to the frame images, and wherein, when the feature quantities are extracted again after the transition from the condition where the lane lines are identifiable to the condition where the lane lines are unidentifiable, and a difference between the feature quantities stored in the storage and the feature quantities extracted again falls within a predetermined range, the estimator is configured to estimate, on a basis of the feature quantities extracted again, the lane lines after the transition to the condition where the lane lines are unidentifiable.

2. A lane-line recognizing apparatus comprising circuitry configured to:

acquire a traveling environment information on a traveling environment in front of an own vehicle;

extract feature quantities of lane-line components of lane lines from each of frame images on a basis of the traveling environment information acquired, the lane lines respectively defining a right side and a left side of a traveling lane on which the own vehicle is traveling, the frame images being directed to a predetermined search region extending from a region in front of the own vehicle to a region far from the own vehicle;

identify the lane lines on the basis of the feature quantities extracted;

store the feature quantities extracted; and when the feature quantities are extracted again after a transition from a condition where the lane lines are identifiable to a condition where the lane lines are unidentifiable, estimate, on a basis of the feature quantities stored, the lane lines after the transition to the condition where the lane lines are unidentifiable, wherein the circuitry stores the feature quantities corresponding to the frame images, and wherein, when the feature quantities are extracted again after the transition from the condition where the lane lines are identifiable to the condition where the lane lines are unidentifiable, and a difference between the stored feature quantities and the feature quantities extracted again falls within a predetermined range, the circuitry estimates, on a basis of the feature quantities extracted again, the lane lines after the transition to the condition where the lane lines are unidentifiable.

* * * * *